April 17, 1962 F. V. LONG 3,030,259

METHOD OF FABRICATING PRECISION FORMED PLASTIC PRODUCTS

Filed March 1, 1956 2 Sheets-Sheet 1

INVENTOR

Francis Vinton Long

BY Stevens, Davis, Miller and Mosher

ATTORNEYS

METHOD OF FABRICATING PRECISION FORMED PLASTIC PRODUCTS

Filed March 1. 1956 2 Sheets-Sheet 2

INVENTOR
Francis Vinton Long
BY Stevens, Davis, Miller and Mosher
ATTORNEYS

United States Patent Office 3,030,259

Patented Apr. 17, 1962

3,030,259

METHOD OF FABRICATING PRECISION FORMED PLASTIC PRODUCTS

Francis Vinton Long, P.O. Box 592, Shreveport, La.

Filed Mar. 1, 1956, Ser. No. 568,759

5 Claims. (Cl. 156—245)

This invention relates to accurately formed plastic members, and more particularly to a novel method and apparatus for use in the fabrication thereof.

In many fields of science and technology, it is necessary to employ convex elements which have an extremely accurate degree of curvature. For example, in the transmission and reception of radiant energy, especially in the microwave band, it is common to utilize reflective metallic parabolic elements. In a microwave transmitting antenna, radiant energy is released at the focal point of the parabola in order to propagate the outgoing energy in the approximate shape of a beam. Such paraboloid surfaces are also used as receiving antennae in applications such as microwave relay towers, where they are characterized by excellent directivity.

Moreover, in systems which utilize solar radiation it is common to employ a metallic paraboloid surface to collect and focus the incident solar energy. An example of a system utilizing such energy is the solar furnace. Metallic paraboloid surfaces used as solar surfaces may attain temperatures approximating 3000° Kelvin, and have furnished valuable data on the ignition of materials by exposure to radiant energy. It will be appreciated in this connection that the type of parabolic receiver elements used in conjunction with microwave relay stations and solar installations may assume extremely substantial dimensions.

The problems involved in accurately machining the curved surface of such large metallic elements are well-known to those skilled in the art. Even where facilities are available for machining such a unit, it may be unusually difficult to transport it to the site of a remote installation. Where the installation of such a large metallic reflective element is required at one of the peripheral stations of an early warning radar system, these difficulties are very obvious. Since many of such peripheral stations are situated in regions which are characterized by extremely intemperate weather, the transportation and installation of such an extremely accurate large metallic reflector represents a formidable task. Additionally, the ever present risk of warping or straining the reflector in transit renders the entire operation even more delicate.

The present invention contemplates an ingenious method of fabricating large reflective paraboloids which avoids the earlier enumerated difficulties. If necessary, the fabrication of the large paraboloids may be accomplished at a remote site by practicing certain aspects of the present invention. The application of the method to other diverse forms of plastic items will become readily apparent as the description proceeds.

Accordingly, therefore, a primary object of the present invention is to provide a novel method of fabricating accurately formed plastic members.

Another object of the present invention is to teach a method and apparatus for constructing reflective paraboloids for use in focusing radiant energy.

Another object of this invention is to disclosed ingenious methods and means for economically building up plastic members with an extremely accurate degree of curvature.

Another object of this invention is to teach an economical method of constructing large convex plastic members for installation at remote sites with no diminution in accuracy caused in transit.

A further object of this invention is to provide an ingenious method of precision plastic molding, readily adaptable to use in fabricating any of a number of plastic items.

A further object of this invention is to disclose a practical and economical article of manufacture.

A further object of the present invention is to disclose a hollow plastic reflective element which is suited for use in focusing the radiations which occur in the electromagnetic spectrum, and which is capable of clearing its reflective surface of atmospheric accumulations.

A further object of the invention is to teach a method of fabricating reflective elemnts for use in solar furnaces.

A still further object of the present invention is to illustrate a plurality of plastic articles of manufacture concurrently with ingenious means and method for accurately fabricating same.

Other and further objects of the present invention will become apparent through reference to the following description and drawings, in which like numerals indicate like parts and in which.

Figure 1:
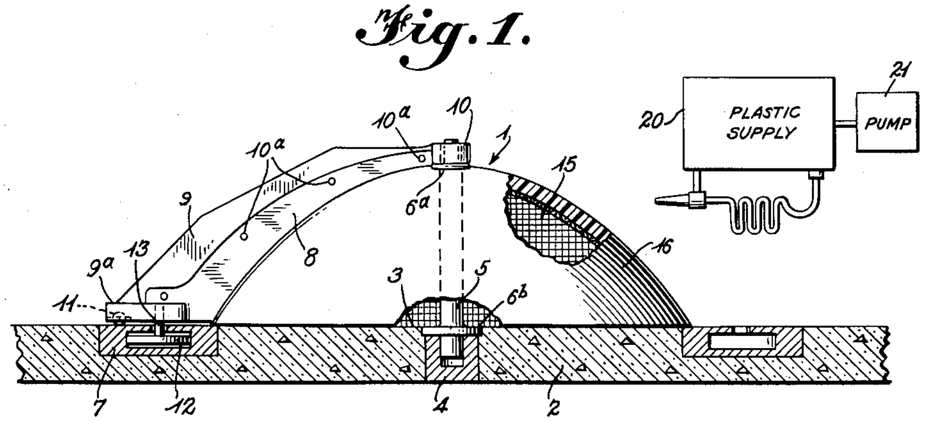
FIGURE 1 illustrates a fragmentary view, partly in section, of the method of constructing an accurately shaped base member according to one aspect of the present invention.

Turning now to the drawings and more particularly to FIGURE 1, the numeral 1 indicates generally the method and apparatus for constructing an accurately shaped base member according to one aspect of the invention. The numeral 2 indicates a slab which may be composed of concrete or any other suitable material capable of providing a satisfactory level working surface 3.

The slab 2 is provided with a hollow annular bushing 4 securely mounted therein. A center post 5 is mounted to engage the bushing 4. The post 5 is equipped with an annular upper flange 6*a* and an annular lower flange 6*b*. The lower side of flange 6*b* abuts the flat radial upper surface of the bushing 4. The upper surface of the flange 6*b* is flush with the working surface 3, as shown in the drawing.

As will be explained more fully later in this specification, the post 5 shown in FIGURE 1 may comprise one of a series of interchangeable posts, any one of which may be used to construct a base member with a different degree of curvature.

At the outer portion of the slab 2 there is shown a ring member 7, in section. The ring member 7 may comprise a metallic annular ring with an accurately machined T-slot provided therewithin. The ring member 7 is embedded in or otherwise securely affixed to the slab 2 to prevent relative motion with respect thereto.

A rotatable blade 8 and a blade support 9 are shown in the left-hand portion of FIGURE 1. The blade support 9 is provided with an anti-friction journal 10 which fits down over and engages the upper end of center post 5. The anti-friction journal 10 is supported vertically by the upper flange 6*a* on the post 5. Moreover, the journal 10 is bored or otherwise machined to engage post 5 very accurately, with a minimum of unnecessary looseness.

The opposite extremity of the blade support 9 terminates in a footing 9*a*. The footing 9*a* is provided with a spherical ball 11 which is supported in a spherical ball seat. The ball 11 is thus rotatably interposed between the footing *9a* and the upper surface of the ring member 7, in order to substantially reduce the rolling friction therebetween.

The footing *9a* is provided with a roller 12 which is journaled for rotation on a pin 13. The pin 13 is secured to the footing as seen in the drawing. The roller 12 is machined to very accurate dimensions and is mounted to engage the T-slot within ring member 7 with a very closely controlled tolerance. If desired, the ring member 7 may be provided with gear teeth machined on the innermost axial periphery of the T-slot. Then, of course, the roller 12 is replaced with an accurately machined gear which meshes with the gear teeth in the ring member 7.

The blade 8 shown in FIGURE 1 is secured to blade support 9 by means of a plurality of bolts 10*a*, or by other suitable securing means. The blade 8 may comprise one of a series of interchangeable blades, each of which is machined to an extremely accurate degree of curvature. By virtue of the accurate fit which is maintained between the journal 10 and the post 5, as well as between the roller 12 and the T-slot, it is possible to rotate the curved blade 8 through an extremely accurate circular path. It should be appreciated in this connection that the assembly which includes the roller 12 and T-slot in the ring member 7 may be dispensed with under certain circumstances. Where the fabrication of the accurately curved plastic product is to be accomplished at a remote site, the use of an elongated journal 10 provides sufficient accuracy. The close tolerances maintained between the journal 10 and center post 5 prevent wobbling of the knife blade during rotation and provide an accurately shaped base member.

The method of operating the apparatus shown in FIGURE 1 will now be described. After the insertion in bushing 4 of the appropriately sized center post 5, a subbase 15 is prepared. The subbase 15 may be constructed of expanded metal, chicken wire, or any equivalent aggregate of compact metallic strands. If desired, the subbase 15 may be constructed of wood laths or the like. The use of burlap or other suitable fabric is satisfactory and is deemed to fall within the purview of the present invention. Since any of a number of conventional materials are suitable for use in constructing the subbase, it will be appreciated that the invention is not limited to any specific form thereof. After the subbase 15 has been constructed approximately to the desired curvature, an outer surface 16 of plaster of Paris or other suitable material may be applied thereto in semiliquid form. The quantity of such material is, of course, such as to extend into and intersect the curved path described by blade 8 during rotation.

After the subbase 15 is adequately covered with the semiliquid material, the accurately curved blade 8 is rotated in a circular path. The manner in which the precise engagement of journal 10 and roller 12 with their mating members acts to insure a highly accurate circular trajectory has been explained in detail earlier in this specification.

By continuing to revolve the blade 8, the outer surface 16 is machined or shaved to the desired shape. This shape will, of course, comprise the identical profile of the curved blade 8. It will be evident in this connection that by merely changing the center post 5, and installing the proper blade 8, a convex base member of any desired cross-sectional profile can be obtained.

It should be appreciated in this connection that the outer layer 16 need not in all cases be brought to the finished shape while semimolten. The terms semiliquid and semimolten as used in connection with the material used to form the outer surface 16 denote a flowable condition. The material of the outer surface 16 may be allowed to harden, and undergo machining after a period of solidification has elapsed. In general, the invention contemplates the use of any readily machinable substance for constructing the outer layer 16, and it is desired not to limit the invention to any specific material. Moreover, conventional means of applying such materials, such as the Gunite method of applying liquid cement are deemed to fall within the purview of the invention.

After the outer surface 16 is cut or shaved to shape, the accurately sized base member may be used as a master mold in fabricating microwave antennae, parabolic reflectors, and similar articles of plastic.

Figure 2:
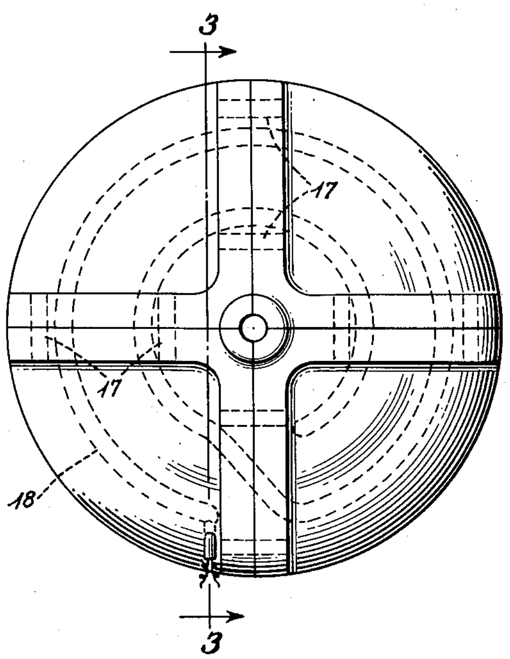
FIGURE 2 shows a rear plan view of a ribbed reflective paraboloid constructed according to one of the methods of the present invention.
Figure 3:
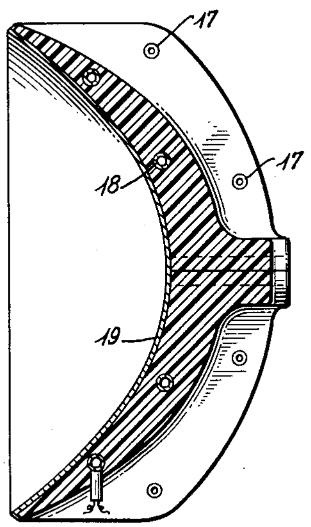
FIGURE 3 shows a section view taken along the line 3—3 in FIGURE 2, and looking in the direction of the arrows.

In one aspect of the invention, a plastic material is applied in molten form to the base member 1. The particular plastic which is to be applied to the base member may comprise a phenolic condensation product such as Bakelite. The various phenolic, silicone, and epoxy resins may be employed in practicing this aspect of the invention. Other plastics which are readily applied when molten and which harden into a rigid unitary integral mass are equally suitable for use in practicing the method. It will be appreciated that the plastic may be brushed on, as well as sprayed on. The plastic may be impregnated with flexible elongated fibers or strands in order to improve the structural strength of molded plastic and product. For instance, fiberglass, glass wool, or any fibrous mass of flexible strands of material which is compatible with the particular plastic may be used in this application.

Where great precision in the rear profile of the plastic work product is required, a suitable mold member may be positioned concentrically with the base member 1 and secured by suitable lock-down bolts. Then, the molten plastic is merely pumped between such mold member and the accurately curved base member 1 under pressure. The details of construction, and the placement of such a mold member are believed conventional and have not been illustrated. It is sufficient for purposes of this patent specification to point out that the casting of a particular member such as illustrated in FIGURE 2 and FIGURE 3 is simply a matter of constructing and properly positioning a similarly shaped device over the base member 1.

Where great structural strength is required, a plurality of radial ribs may be molded integrally with the entire assemblage. For instance, in the construction of extremely large parabolic reflectors for use in early warning radar stations, or in solar energy installations, means must be provided for supporting the parabolic reflector unit from a tower.

Adequate support means may be readily provided by positioning suitable elongated annular bushings 17 transversely of the radial ribs which are located on the rear of the molded structure. For the purposes of structural strength, the bushings 17 may be composed of metal. Conversely, in the construction of a radome or the like, the bushings 17 as well as the entire assemblage, may be composed of a material which is substantially transparent to electromagnetic radiation. It will be appreciated that the bushings are positioned before the actual molding process, and that the molding material actually hardens around the bushings.

It will be obvious that the method of this invention is not limited to the fabrication of radiant energy reflectors, but rather, is generally applicable to an almost unlimited variety of products. The pointed radome which is mounted as the nosepiece of a single engine fighter aircraft to enclose the radar equipment located therewithin is an example of such a product. Other species of radomes which are employed as external shields on the fuselage of heavier aircraft may also be fabricated by the methods of this invention. The economical construction of large plastic Arctic shelters is readily achieved by the ingenious methods disclosed herein. Moreover, the larged domed shelter which is used to enclose the radar antenna of an off-shore installation, such as "Texas Tower" may be readily fabricated by the method of this invention. If necessary, such a shelter may actually be fabricated at the installation site.

Turning now to an alternate method of constructing accurately shaped plastic structures, it should be understood that the invention is by no means limited to the earlier described use of molten plastic. The ultimate desired shape may also comprise a plurality of adjacent layers of plastic impregnated fabric. The term "fabric" as used herein encompases glass, cotton, rayon, nylon, asbestos, paper, and other woven fibrous materials.

More particularly, the ultimate shape may be obtained by applying a first layer of fabric or cloth, followed by a thorough application of suitable polyester resins to the surface thereof. A second layer of cloth is then applied directly on top of the previous layer of resin impregnated cloth. This process of applying alternate layers of fabric and resin is continued until the ultimate shape is obtained.

It will be understood that in addition to polyester resins, there may be employed other suitable plastic impregnants between the layers of fabric. For instance, materials such as phenolic, silicone, epoxy resins, and the like may be employed in practicing this invention. A plurality of radial ribs may be provided for during the application of the successive alternative layers, and suitable bushings 17 may be embedded therewithin. During the hardening period, the alternate layers of fabric and plastic applied according to this aspect of the invention will fuse into a rigid integral mass having the desired form.

After fabrication of the work product by any of the methods of this invention it may be removed from the base member. Then, in order to expedite the transportation to a remote installation, the structure may be subdivided into a plurality of matched pieces. A suitable cutting tool, such as a diamond tipped saw may be used to bisect each of the four radial ribs of the parabolic reflector shown in FIGURE 2. Such a reflector may be cut into more than four segments, in order to expedite and render more convenient the transportation thereof to assembly site. In order to reassemble such a unit in the field it is merely necessary to align the opposite mating halves of the bushings 17 by using dowels, or other convenient means. This, of course, aligns the mating edges of the precisely curved inner surface.

If subdivision of the molded structures after completion is deemed undesirable the units may be fabricated in sections. This is accomplished by spacing a plurality of vertical partitions or separators on the base member 1 prior to the molding process. The molten plastic, or resin impregnated fabric may then be applied to form a plurality of sections, rather than an integral unit. In order to provide a homogeneous structure, the separators may be composed of the same material used in fabricating the unit itself and, be later incorporated therewithin. A different material having the same response to radiant energy as the molding plastic may be employed for the separator, if desired.

Regardless of the particular method employed in constructing the workpiece the base member may be used for polishing it, after a suitable curing period. More particularly, should the size of the unit or the unequal cooling of the various portions cause "checking" or warpage, a mild abrasive agent fluid-suspended may be applied to the base member and the unit gently rotated thereupon in order to restore its precisely controlled shape.

For some applications of the precisely formed plastic member, it may be necessary to provide a metallic coating on the inner surface thereof. This is true where the member is to be used as an antenna element for propagating radient energy. The application of the metallic film may be accomplished by any of a number of conventional methods. For example, such a film may be applied by vacuum deposition, in the form of metal foil by plating, or by any other suitable method. The breadth of the invention, it will be understood, is not to be limited by restricting it to any specific method of applying the metallic coating to the reflective surface of the antenna.

Where the plastic products fabricated according to this invention are intended for use in an intemperate climate, means are provided for clearing the reflective surface of atmospheric accumulations. The means for accomplishing this are shown in FIGURE 2. The numeral 18 in this figure depicts a heating element located in the plastic reflector.

The element 18 may comprise a coil of resistance wire such as Nichrome, or other suitable material. It will be appreciated by those skilled in the art that the element 18 may take a variety of equivalent forms, such as a plurality of convolutions of extremely fine resistance wire. Element 18 is spaced from the upper surface 16 of base member 1 prior to the fabrication of the plastic product and becomes securely imbedded therewithin.

At the installation site, means are provided for supplying electrical energy to elements 18. The heat generated thereby is employed in melting atmospheric deposits of sleet or ice which have become encrusted upon the reflective metallic surface 19. The benefits flowing from the encapsulation of the heating element 18, are, of course, not restricted to radiant energy reflectors. Provision for clearing a plastic member of such atmospheric accumulations may also be of great utility in many other applications thereof. For instance, the construction of Arctic shelters according to the methods of this invention may include the step of positioning a suitable resistance element for encapsulation within the walls of the shelter.

Figure 4:
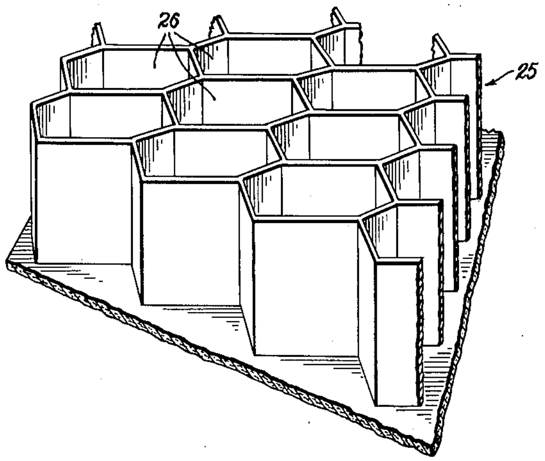
FIGURE 4 shows a section of multicellular honeycomb material used in practicing one aspect of the invention.

Turning again to the drawing, and more particularly to FIGURE 4 thereof, the numeral 25 indicates generally a plurality of thin walled cells joined together at their peripheral boundaries. The side walls 26 of this multicellular structure, or honeycomb core, may be composed of kraft, fabric, glass cloth or other suitable thin walled porous material. The side walls are impregnated with a suitable plastic. A phenolic condensation product, or resin, such as Bakelite is suitable for this purpose. The method in which a plurality of laminations of honeycomb core may be employed in forming an accurately curved element will now be explained.

After the base member 1 has been fabricated to the desired cross-sectional profile, a first layer of fabric is applied thereover. This fabric is then impregnated with a suitable plastic such as one of the polyester resins. If desired, more than one layer of plastic impregnated fabric may be thus built up. A layer of honeycomb core is than applied to the plastic impregnated fabric. Following this operation, a layer of plastic impregnated fabric is applied over the layer of honeycomb core. In order to secure satisfactory penetration of the fabric, a brush may be used in the application of the plastic impregnant. Successive alternate layers of honeycomb core and fabric may be employed to build up an accurately curved member of the desired thickness. During curing, the successive lamina will fuse and harden into a rigid unitary structure having high mechanical strength.

Figure 5:
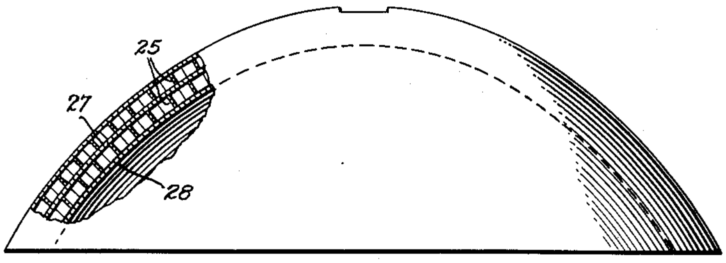
FIGURE 5 illustrates an accurately curved element which includes the multicellular honeycomb material shown in FIGURE 4.

In FIGURE 5, a reflective element using the successive layers of honeycomb core and fabric is illustrated. The plural cells 25 are anchored above and below by the fabric layers 27 and 28, respectively. The interior surface has, of course, been metallized by one of the conventional methods. It will be appreciated that the method of honeycomb core construction taught herein is not limited to use with alternate layers of plastic impregnated fabric. If desired, the upper and lower layers which anchor the honeycomb core may comprise plastic reinforced with fiberglass or other suitable fibrous material. These layers may be applied according to the methods taught earlier in the specification. The method of thus fabricating accurately curved elements with honeycomb core is readily adaptable to the manufacture of radomes, Arctic shelters, parabolic antennae and the like. The construction may be carried out in transversely separated segments as earlier mentioned in this specification. Moreover, provision may readily be made for integrally affixed transverse ribs, as well as for a properly insulated heating element within the interior of the structure.

While I have, therefore, disclosed my invention in such full, clear and concise terms as will enable those skilled in the art to practice and understand it, it will be readily obvious that various modifications, substitutions and alterations may be made therein without departing from the spirit and scope of the appended claims.

What is claimed is:

1. The method of constructing a large accurately curved reflective plastic element for use in remote regions of subnormal temperature which comprises machining a base member which includes an aggregate of strands to the desired profile, positioning a plurality of vertical separators on said base member, applying a plastic in a flowable condition between said separators on said base member, allowing said plastic to harden, removing and assembling the hardened plastic elements, and metallizing said assembled plastic elements.

2. The method of fabricating a large sized accurately dimensioned self-clearing plastic molded member for use in remote regions of subnormal temperature which comprises constructing a base member which includes an aggregate of strands to the desired shape, positioning an electric heating element in spaced relationship with respect to said base member, applying plastic in flowable condition to said base member to enclose and solidify around said heating element to form said molded member, removing said molded member from said base, and providing a conductive metallic coating on the inner surface of said plastic molded member.

3. The method of fabricating an accurately curved ribbed plastic product of large dimensions for use in remote regions of subnormal temperature which includes rotating a curved blade to cut a base member comprised of an aggregate of strands with an outer layer of plaster of Paris to the desired curvature, securing a ribbed mold member over said base member, positioning a plurality of bushings in spaced relation to said base member and said mold member, and applying plastic in a flowable condition between said mold member and said base member to assume the shape of the space contained therebetween and enclose at least a portion of said bushings within said plastic.

4. An apparatus for constructing a large sized accurately curved plastic member for use in remote regions of subnormal temperature which includes a slab, an interchangeable center post vertically positioned to engage said slab, a ring member provided with an annular slot secured within said slab, a blade support rotatably mounted upon said center post to revolve concentrically with respect thereto said blade support including roller means mounted to revolve within said annular slot, an interchangeable blade secured to said support for rotation therewith and having a predetermined degree of curvature, bearing means mounted to reduce friction between the plane of said slab and said blade support, and, means for rotating said curved knife about said center post.

5. The method of constructing a large sized accurately curved plastic product for use in remote regions of subnormal temperature which includes erecting a base member comprised of an aggregate of strands with an outer layer of material thereover, rotating an accurately shaped blade into cutting engagement with said material to provide a predetermined contour applying at least one layer of plastic impregnated fabric over said base member, applying a layer of honeycomb core over said plastic impregnated fabric, positioning an electric heating element in contact with said honeycomb core and applying at least one layer of plastic impregnated fabric over said electric heating element and said honeycomb core, whereby said layers of fabric and said honeycomb core fuse into a rigid unitary mass having the contour of said base member.

References Cited in the file of this patent

UNITED STATES PATENTS

| | | |
|---|---|---|
| 744,509 | Donahoo | Nov. 17, 1903 |
| 1,914,858 | Horine | June 20, 1933 |
| 2,335,123 | Kinnard | Nov. 23, 1943 |
| 2,384,845 | Miller | Sept. 18, 1945 |
| 2,391,432 | Marschner et al. | Dec. 25, 1945 |
| 2,460,242 | Renaud | Jan. 25, 1949 |
| 2,471,828 | Mautner | May 31, 1949 |
| 2,545,981 | Warp | Mar. 20, 1951 |
| 2,572,430 | Balton | Oct. 23, 1951 |
| 2,584,110 | Blackburn et al. | Feb. 5, 1952 |
| 2,700,632 | Ackerlind | Jan. 25, 1955 |
| 2,747,180 | Brucker | May 22, 1956 |
| 2,750,632 | Kish | June 19, 1956 |
| 2,799,017 | Alford | July 9, 1957 |
| 2,802,240 | Thomas | Aug. 13, 1957 |